United States Patent [19]

Crane et al.

[11] Patent Number: 4,597,296

[45] Date of Patent: Jul. 1, 1986

[54] TORQUE TRANSDUCING ATTACHMENTS FOR AIR-DRIVEN IMPACT TOOLS

[76] Inventors: David O. Crane, Manor Farm House, Twycross, Leicester; Thomas McDonald, 31 Hardwicke Grove, West Bridgford, Nottingham; Ronald F. Horner, Flat 1, Hinckley Road, Stoke Golding, Nuneaton, all of England

[21] Appl. No.: 649,318

[22] Filed: Sep. 11, 1984

[30] Foreign Application Priority Data

Sep. 12, 1983 [GB] United Kingdom ................. 8324379
Feb. 4, 1984 [GB] United Kingdom ................. 8402993

[51] Int. Cl.⁴ .......................... G01L 3/12; B25B 23/14
[52] U.S. Cl. ................................ 73/862.33; 73/862.23
[58] Field of Search ........... 73/862.21, 862.33, 862.34, 73/862.23; 173/12

[56] References Cited

U.S. PATENT DOCUMENTS

| | | | |
|---|---|---|---|
| 3,625,055 | 12/1971 | Lafourcade | 73/862.33 |
| 3,938,890 | 2/1976 | Flavell | 73/862.33 X |
| 3,940,979 | 3/1976 | Ward et al. | 73/862.33 |
| 4,055,080 | 10/1977 | Farr et al. | 73/862.21 |
| 4,345,481 | 8/1982 | Schroyer | 73/862.34 |
| 4,446,746 | 5/1984 | Aoshima et al. | 73/862.33 |

FOREIGN PATENT DOCUMENTS 2852633 6/1980 Fed. Rep. of Germany ... 73/862.33

*Primary Examiner*—Charles A. Ruehl
*Attorney, Agent, or Firm*—Cohn, Powell & Hind

[57] ABSTRACT

A torque transducing attachment (2) can be fastened to a air-driven impact tool (8) at its rear end. A shaft (20) in bearings (16) in a housing (12) has a torque transformable part (22) with integral bushes (24, 26) with apertures (29) on either side. The relative displacement under torque of the apertures (29) varies the amount of light transmitted from a stabilized LED source (36) to a photo detector (46) and the resulting signal is passed through frequency responsive network.

22 Claims, 10 Drawing Figures

TORQUE TRANSDUCING ATTACHMENTS FOR AIR-DRIVEN IMPACT TOOLS

DESCRIPTION

1. Field of Invention

The invention relates to torque transducing attachments for air driven impact tools used extensively in assembly operations to fasten nuts etc.

2. Background of Invention

In an article in Eureka 1983 a torque transducing system made by Adams Limited is described. This uses a pair of adjacent gratings through which varying amounts of light are transmitted depending on torque level using six light sources and six photo detectors.

In endeavouring to provide a torque transducing system for use on air driven impact tools used frequently by operators to tighten nuts, one faces severe problems not encountered where one basically merely checks that a nut has been properly fastened. There is considerable vibration. In addition there are extremely high acceleration and deceleration forces in the use of air-driven impact tools which necessitate that the torque occurs only briefly and then drops rapidly so that the measurement at the moment of impact has to be correct if the attachment is to operate dependably.

It is amongst the object of the invention to overcome these difficulties to provide reliable and accurate torque measurement for use by factory operatives in assembly operations.

SUMMARY OF INVENTION

In a first aspect, the invention utilises the momentary angular off-set of a pair of apertured integral bushes to vary light transmission through the apertures from a stabilised LED source.

The LED source is compact and rugged, has a low current consumption and yet provides enough radiation to provide a meaningful signal from the bush apertures if it is stabilised. The integral bush construction, preferably from a light material, permits the aperture arrangement to withstand the extremely high G-forces without material distortion.

In a second aspect of the invention there is provided a torque transducing system including a housing, bearings in the housing, a rotatable shaft rotatably supported by the bearings, said shaft having a torque receiving input end and an output end for supplying torque to a workpiece, a first annularly arranged light transmitting means mounted to be in substantially fixed angular relationship to the input end, a second annularly arranged light transmitting means mounted to be in substantially fixed relationship to the output end, respective angular movement of the first and second light-transmitting means leading to a variation in the total amount of light transmittable, a low power light source for illuminating the first and second light transmitting means at a peripheral position thereof through a fibre-optic bundle, first means for sensing the amount of light transmitted at that position, and a second means for sensing the amount of light emitted by the source through a first branch of the fibre optic bundle, and a control means responsive to the second light sensing means for maintaining the amount of light emitted from the low power source substantially constant.

Other features of the invention permitting bi-directional torque detection and the avoidance of dark current effects are set out in the claims. A fibre-optic arrangement permits the various features to be provided simply and compactly.

DRAWINGS

FIG. 9 shows the circumferential detail enlarged;

DESCRIPTION WITH REFERENCE TO DRAWINGS

Figure 1:
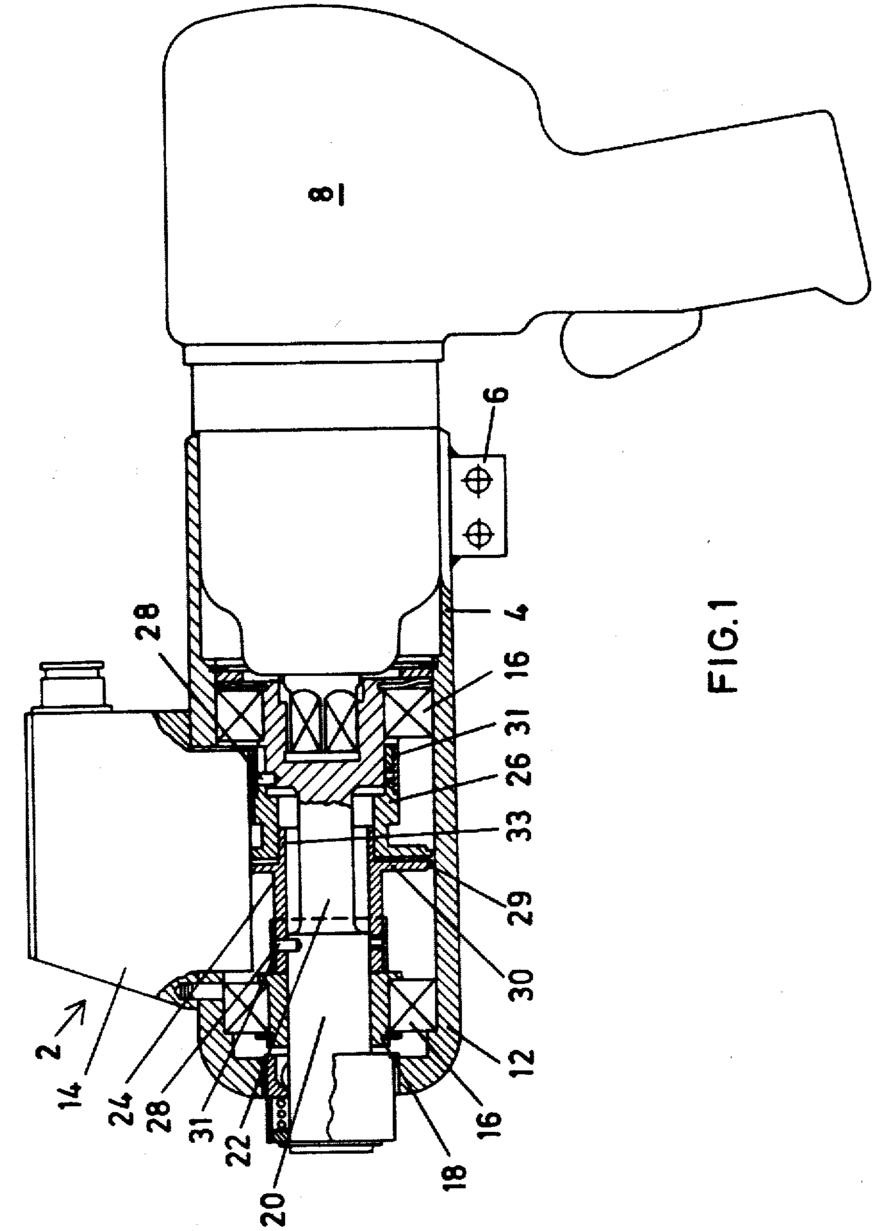
FIG. 1 shows a side view partly in section of an attachment according to the invention secured to an air-driven impact tool.

An attachment 2 (FIG. 1) is secured by clamping collar 4 and screws 6 to air driven impact tool 8 having an output member 10.

The attachment has a housing 12 mounting a measuring head 14 and a pair of spaced bearings 16 supporting directly and indirectly through collar 18 a shaft 20.

Figure 6:
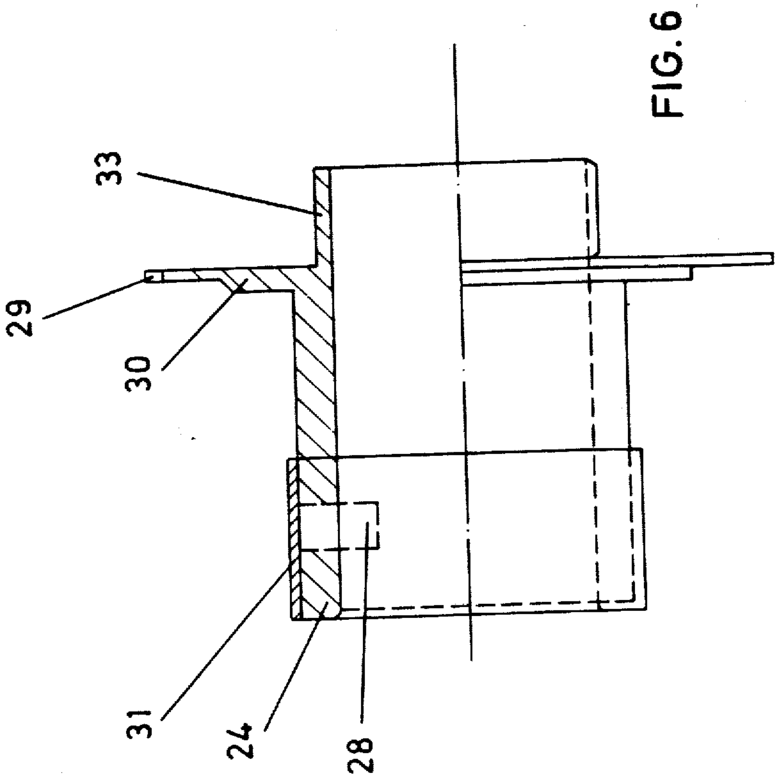
FIGS. 6 and 7 show partial sections through bushes of the attachment of FIG. 1.
Figure 7:
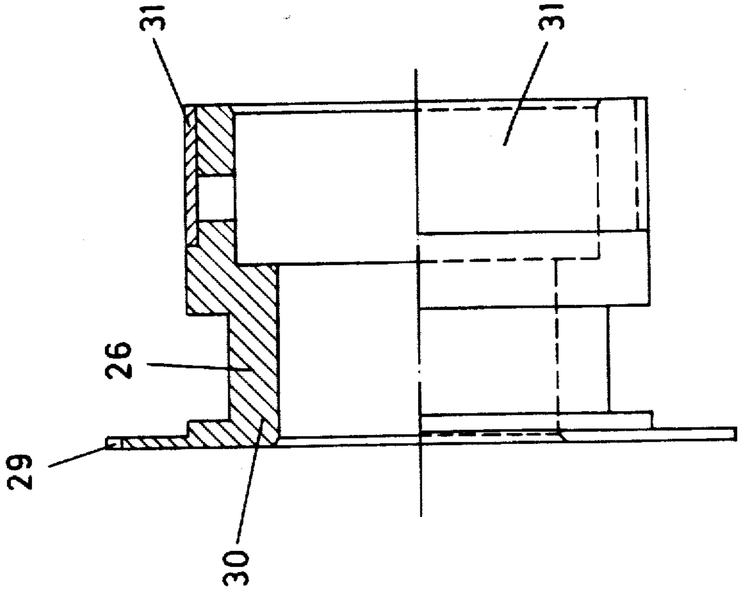
Figure 8:
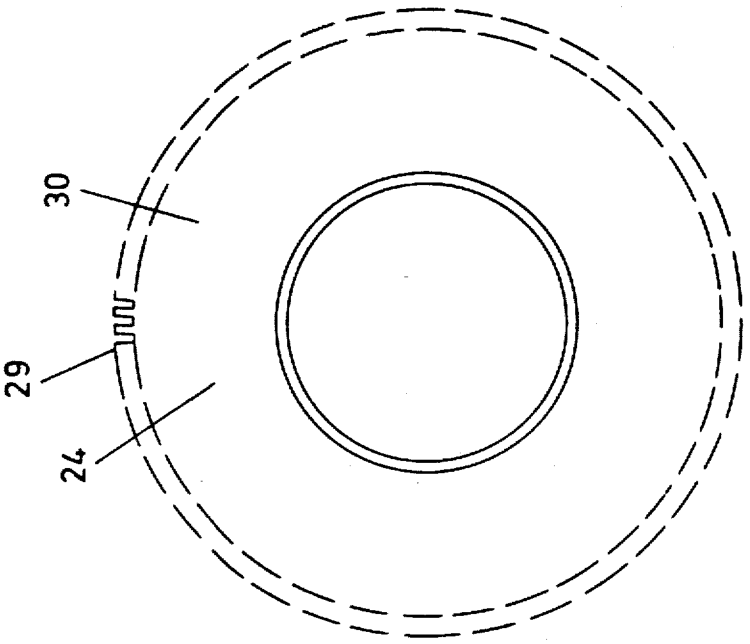
FIGS. 8 and 9 shows plan views of the bushes of FIGS. 6 and 7.
Figure 9:
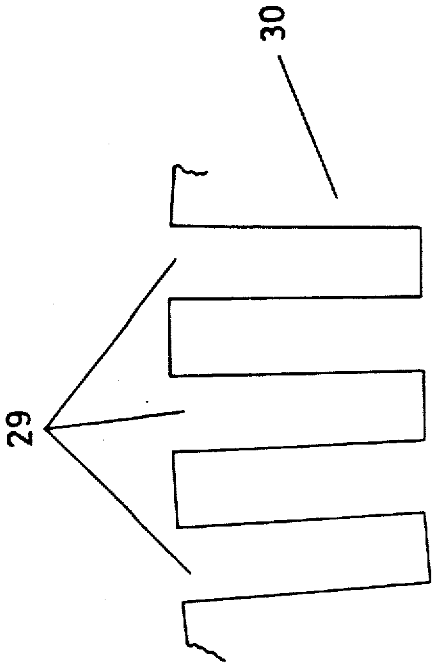

The shaft 20 has a necked portion 22 capable of transforming under torque. Integral titanium bushes 24 and 26 are mounted by pins 28 adhesive etc non-rotatably and impact resistant on either side of the necked portion 22. A sleeve 31 is force-fitted and glued onto the bushes 24 and 26 to hold pins 28 captive. The bushes 24 and 26 (see FIGS. 6 and 7) have flanges 30 with outwardly radiating slots 29 (see FIGS. 8 and 9). The shaft 20 is adapted at its front end to engage a workpiece (not shown). The bush 24 has a journal portion 33 ensuring optimum mutual alignment of the bushes 24 and 26.

Figure 2:
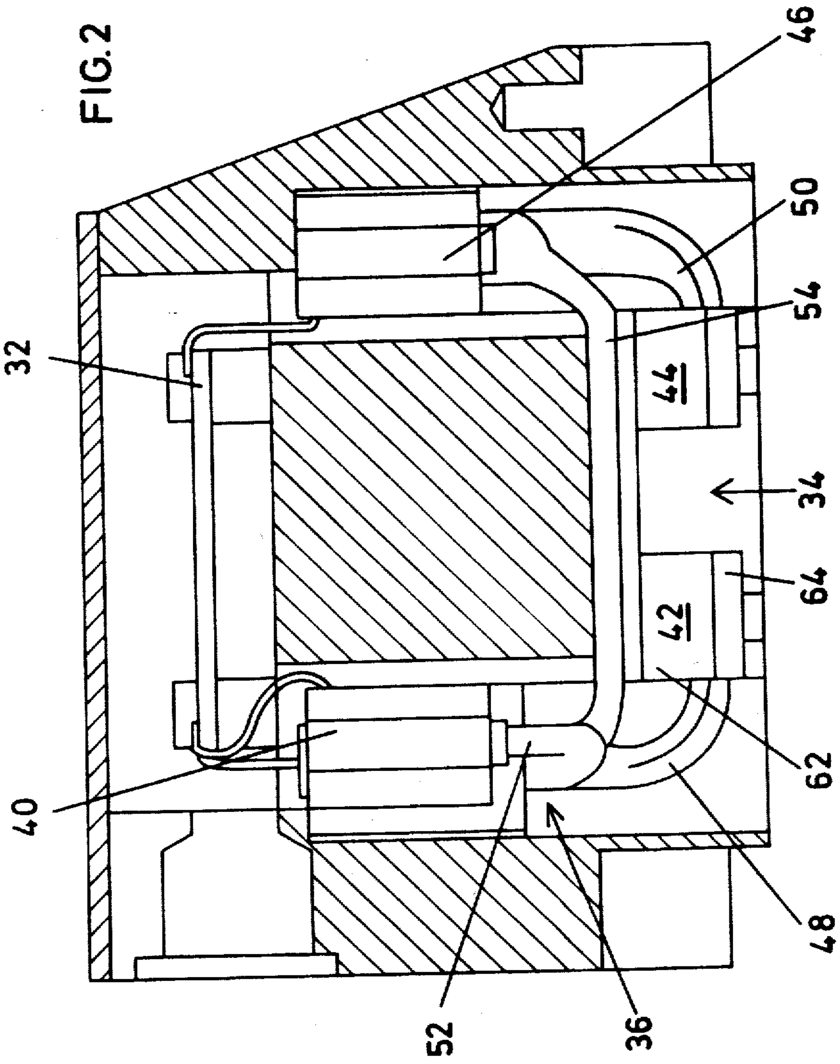
FIG. 2 shows a section through a measuring head of the attachment of FIG. 1.
Figure 3:
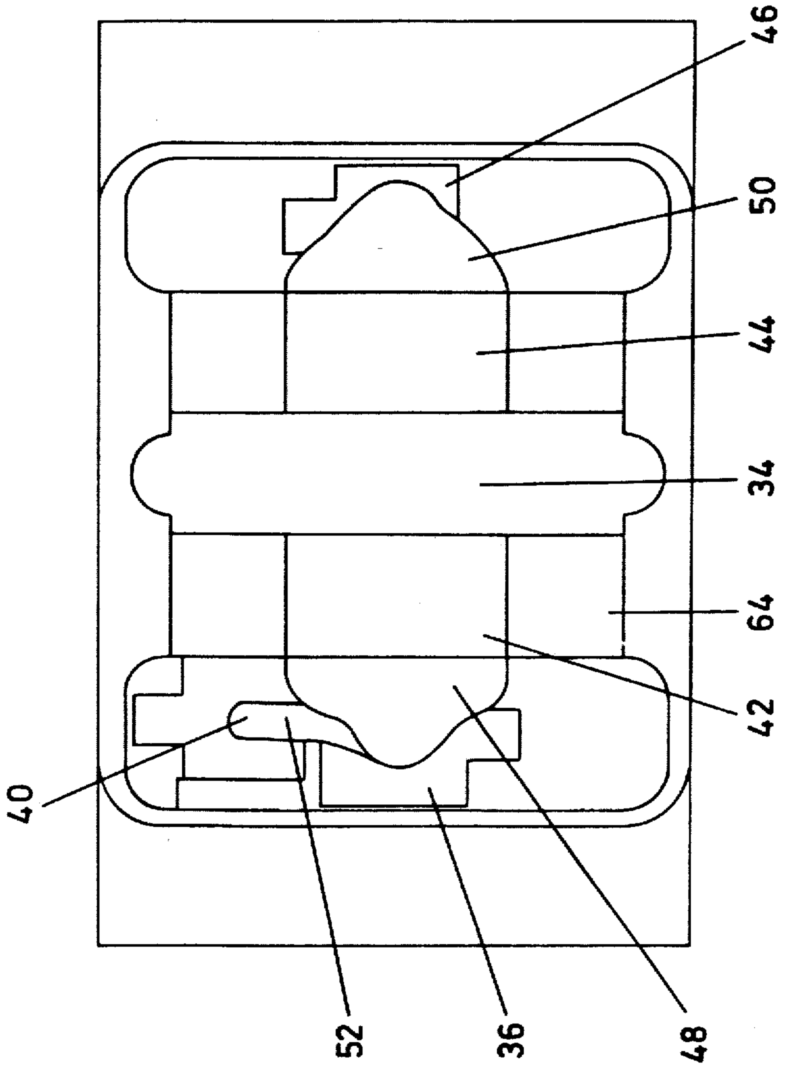
FIG. 3 shows a view from below of the attachment of FIG. 2.

The measuring head 14 (FIGS. 2 and 3) has a body with recesses for mounting a printed circuit board 32 and associated fibre-optic components for straddling the flanges 30 at the measuring area 34. The fibre-optic components include an LED at 36; a feed-back loop to a photo sensor 40; an irradiating head 42 at the area 34; a light receiving head 44 at the area 34; and a photo-sensor 46. Fibre optic bundles interconnect the aforementioned components including bundle 48 between LED 36 and head 42; bundle 50 between head 44 and sensor 46; bundle 52 for the feed back loop between LED 36 and sensor 40; and by-pass bundle 54.

Figure 4:
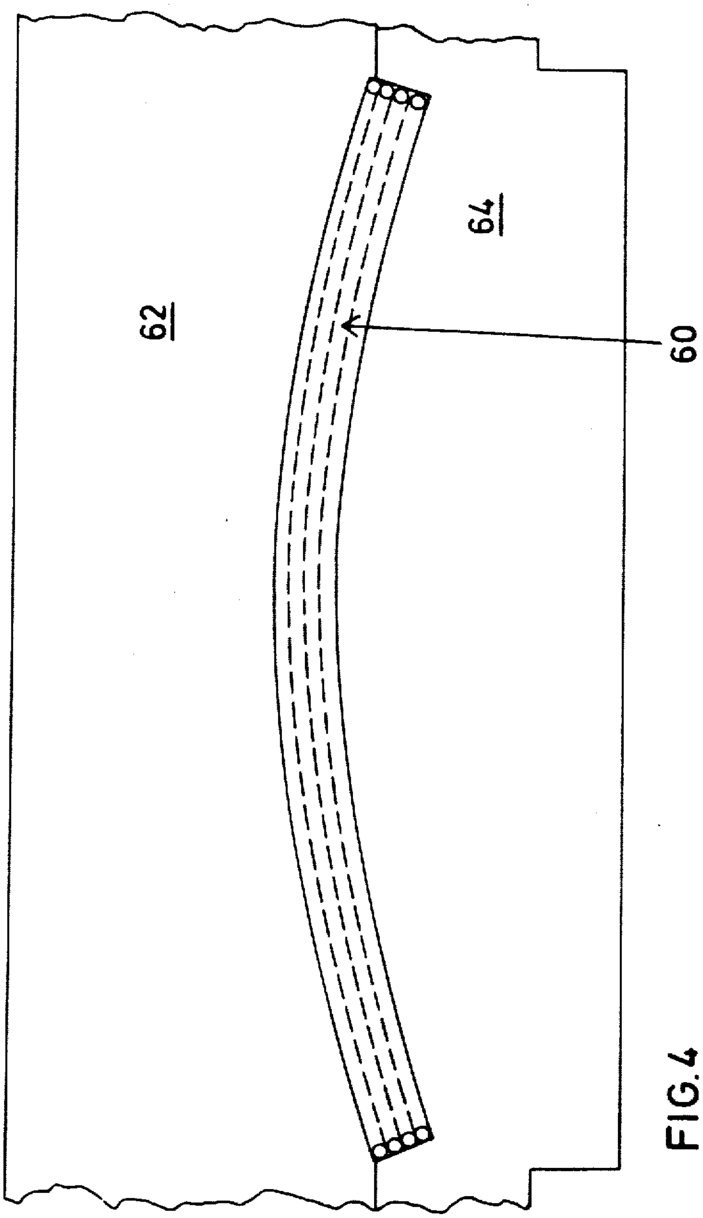
FIG. 4 shows enlarged a detail of the measuring head of FIG. 2.

An end view of the bundles at the radiating heads 42 and 44 is shown in FIG. 4. Four rows of fibres are clamped at 60 between mounts 62 and 64. The rows extend arcuately conforming to the arc formed by the slots 29.

Optionally internally reflecting light guides of similar section may be interposed between the bush flanges and the heads 42 and 44. The necessary intermingling of light from the different fibres can also be achieved by spacing heads 42 and 44 approximately 5 mm without confining the light with guides, the irradiating head 42 being spaced by at least 1 mm from the bush flanges. It may be up to 10 mm away.

Figure 5:
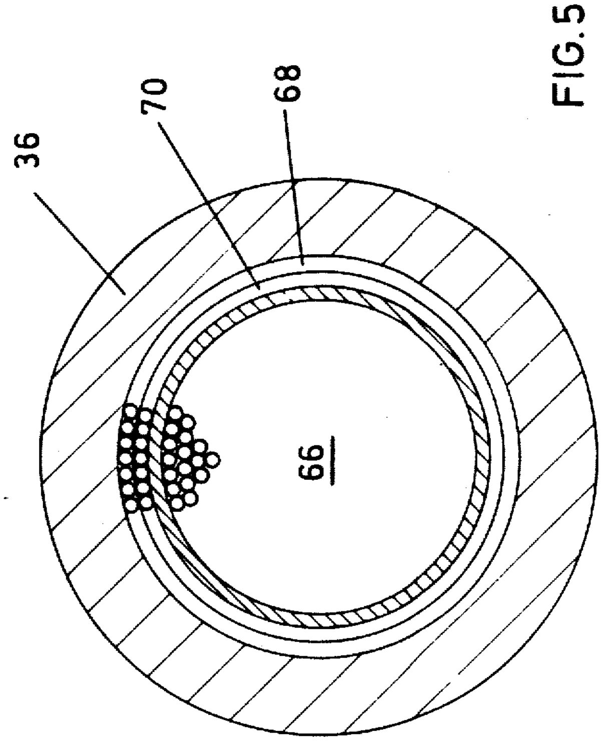
FIG. 5 shows enlarged, other details of the measuring head of FIG. 2.

The LED 36 illuminates a fibre array as shown in FIG. 5 providing a large central area 66 for the fibres leading to the head 42, a small outer area 68 for the fibres of the feed back loop 38 and a small intermediate-area 70 for the fibres of the bundle 54. The fibres of bundle 54 join the fibres from the head 44 in a similar fashion at the photo-sensor 46.

Figure 10:
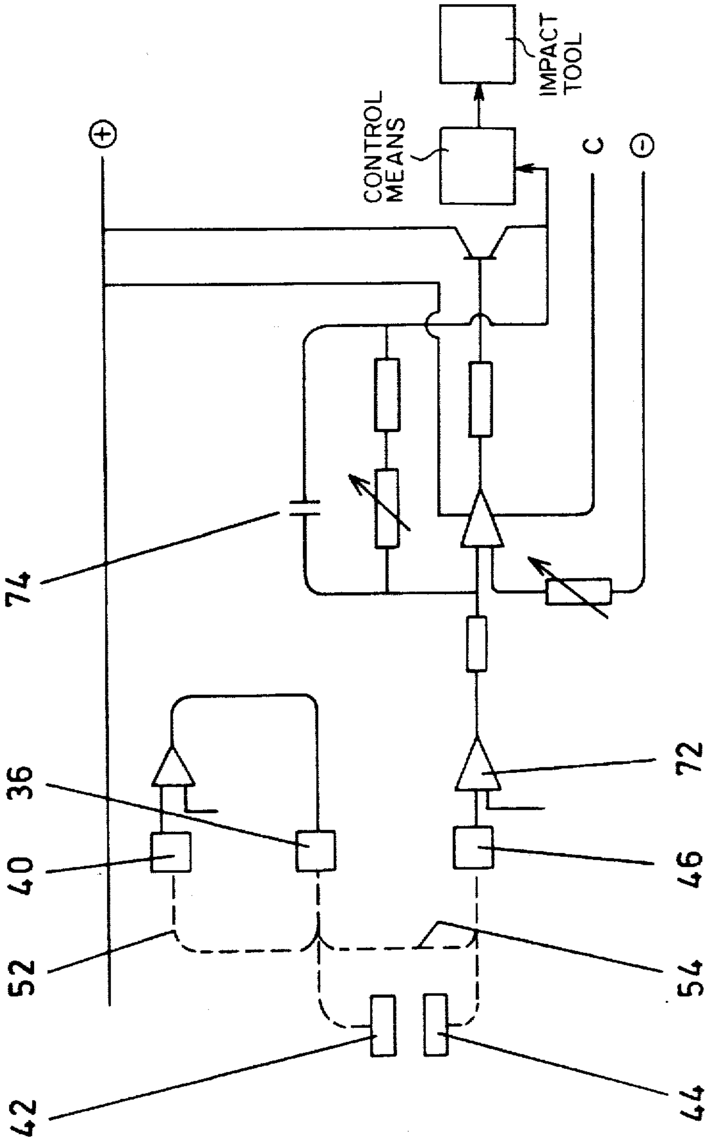
FIG. 10 shows the electrical and optical circuitry for the attachment of FIG. 1.

FIG. 10 schematically illustrates light paths through optic fibres in dashed lines. The feed back control of LED 36 stabilises its output. The torque-dependant signal (kept out of the dark current area by by-pass 54) is supplied to an amplifier 72 which in turn controls an amplification circuit with a capacitive feed back network 74 with a capacitor designed to give a frequency response selected by trial for a given application to provide an output substantially corresponding to the torque "retained" by a nut secured by the rod independant of the torque applied. This means that the output will be proportional to the torque required to turn the nut itself, even though temporarily a much higher impact torque may have been applied by the tool to the nut. An appropriate capacitive feed back network can provide such a proportional output both where the nut tightens slowly in a soft joint or where it tightens quickly in a hard joint.

The system need only consume a small amount of current and is sufficiently strong to stand up to the battering occurring in an impact to a environment yet provides a prolonged period in which a dependable read-out can be obtained.

We claim:

1. A torque transducing system including:

a housing, a shaft mounted in bearings at the rear end and front end of the housing adapted for receiving input torque from the tool at the rear end and providing output torque to a work piece at the front end, said shaft having a portion transformable by torque intermediate the bearings;

a pair of individually integral bushes each having regularly spaced slots at its periphery in close proximity to each other and individually secured to either side of the torque transformable portion;

a stabilized LED source fixed to the housing for irradiating the bush circumference;

first photo detector means fixed to the housing for providing an output proportional to relative angular bush position through a torque transducing range of the system;

a frequency responsive network for receiving the photo detector means output and providing an output to a control means for interrupting torque when a desired torque has been retained by a member to be fastened; and pins provided to locate the bushes against angular movement on the shaft and sleeves mounted surrounding each bush to hold the pins captive.

2. A torque transducing system including:

a housing, a shaft mounted in bearings at the rear end and front end of the housing adapted for receiving input torque from the tool at the rear end and providing output torque to a work piece at the front end, said shaft having a portion transformable by torque intermediate the bearings;

a pair of individually integral bushes each having regularly spaced slots at its periphery in close proximity to each other and individually secured to either side of the torque transformable portion;

a stabilized LED source fixed to the housing for irradiating the bush circumference;

first photo detector means fixed to the housing for providing an output proportional to relative angular bush position through a torque transducing range of the system;

a frequency responsive network for receiving the photo detector means output and providing an output to a control means for interrupting torque when a desired torque has been retained by a member to be fastened;

a further photo detector means provided arranged to detect a proportion of the output of the LED, which portion is not passed along the bush circumference by refractive means and the output of said further photodetector is supplied to a circuit stabilising the LED; and a fibre-optic bundle for conveying the LED source output, a first sub-bundle being connected to irradiate the bush circumference and a second sub-bundle constituting the refractive means connecting to the further photo detector means.

3. A torque transducing system including:

a housing, a shaft mounted in bearings at the rear end and front end of the housing adapted for receiving input torque from the tool at the rear end and providing output torque to a work piece at the front end, said shaft having a portion transformable by torque intermediate the bearings;

a pair of individually integral bushes each having regularly spaced slots at its periphery in close proximity to each other and individually secured to either side of the torque transformable portion;

a stabilized LED source fixed to the housing for irradiating the bush circumference;

first photo detector means fixed to the housing for providing an output proportional to relative angular bush position through a torque transducing range of the system;

a frequency responsive network for receiving the photo detector means output and providing an output to a control means for interrupting torque when a desired torque has been retained by a member to be fastened; and fibre-optic means for conveying the LED output, said means including a first fibre-optic bundle between the LED and a position adjacent the bushes, a second fibre optic bundle, a further photo-detector at the end of the second bundle, a circuit for driving the LED controlled by the output of the further photo-detector to hold the LED output stable, the end of the first bundle adjacent the bushes being spaced from the further photo detector to enable transmitted light to mingle.

4. A torque transducing system including:

a housing, a shaft mounted in bearings at the rear end and front end of the housing adapted for receiving input torque from the tool at the rear end and providing output torque to a work piece at the front end, said shaft having a portion transformable by torque intermediate the bearings;

a pair of individually integral bushes each having regularly spaced slots at its periphery in close proximity to each other and individually secured to either side of the torque transformable portion;

imity to each other and individually secured to either side of the torque transformable portion;

a stabilized LED source fixed to the housing for irradiating the bush circumference;

first photo detector means fixed to the housing for providing an output proportional to relative angular bush position through a torque transducing range of the system;

a frequency responsive network for receiving the photo detector means output and providing an output to a control means for interrupting torque when a desired torque has been retained by a member to be fastened;

the bushes being aligned to permit light to pass through the apertures on transformation of the torque transformable portion in either direction and an optical path is provided for light from the LED to be transmitted directly to the first photo detector means to avoid dark-current characteristics.

5. Torque transducing system including a housing, bearings in the housing, a rotatable shaft rotatably supported by the bearings, said shaft having a torque receiving input end and an output end for supplying torque to a workpiece, a first annularly arranged light transmitting means mounted to be in substantially fixed angular relationship to the input end, a second annularly arranged light transmitting means mounted to be in substantially fixed relationship to the output end, respective angular movement of the first and second light-transmitting means leading to a variation in the total amount of light transmittable, a low power light source for illuminating the first and second light transmitting means at a peripheral position thereof through a fibre-optic bundle, first means for sensing the amount of light transmitted at that position, and a second means for sensing the amount of light emitted by the source through a first branch of the fibre optic bundle, and a control means responsive to the second light sensing means for maintaining the amount of light emitted from the low power source substantially constant.

6. Torque transducing system according to claim 5 in which the first and second light transmitting means are polarised discs whose axes of polarisation are arranged to change the total amount of light transmitted as the discs are moved angularly relative to each other, the low power source is a light emitting diode, and a second branch of the fibre optic bundle is arranged to impinge on the first sensing means to provide illumination for the first sensing means even at low transmitted light levels.

7. Torque transducing system according to claim 5 in which the first and second light transmitting means are gratings, the low power light source is a light emitting diode, and a second branch of the fibre optic bundle is arranged to impinge directly onto the first light sensing means to provide illumination for the first sensing means even at low transmitted light levels, the light transmission area being defined so that transmitted light variations result only from relative grating displacement and not their joint movements.

8. Torque transducing system according to claim 7 in which the fibre optic bundle ends in an annularly extending array of fibres, and a further fibre-optic bundle is provided commencing adjacent the light transmitting means in an annularly extending array opposite the aforementioned array providing an optic path to the first means for sensing the amount of light transmitted.

9. Torque transducing system according to claim 5 in which a further fibre optic bundle is provided for transmitting transmitted light to the first sensing means to avoid dark current effects.

10. Torque transducing system according to claim 5 in which the light source, the light sensing means, and the fibre optic bundle and its branches are supported on a common mounting projecting through an aperture in the housing to straddle the annularly arranged, rotatable light transmitting means.

11. Torque transducing system according to claim 5 in which the rotatable shaft is removably or irremovably secured at both ends and in which the respective light transmitting means are supported midway of the member in close proximity by sleeves locked against angular movement with respect to the ends of the shaft.

12. A torque transducing system including:

a housing, bearing means at the front and rear of the housing;

a shaft mounted in the housing in the bearing means adapted for receiving input torque from a tool at a rear end and providing output torque to a workpiece at the front end;

a resilient torque transformable portion formed by the shaft between the bearing means;

a pair of annular coaxial rings each having a portion extending radially of the shaft, said radially extending portion forming light transmitting windows and an axially extending portion integral with the radial portion mounted resistant to impact torque on a portion of the shaft between the resilient torque transformable portion and the bearing means, the respective rings being so mounted at opposite ends of the torque transformable portion, with their respective radially extending portions being in close proximity, the windows being spaced regularly along the entire periphery of the rings, one to move conjointing with the front end and the other with the rear end, the rings being substantially aligned to allow light transmission in the absence of torque induced resilient deformation and being mutually offset on torque induced resilient deformation of the said shaft portion so as to vary total light transmission;

a fixed light emitting diode irradiating a sector of said rings containing at least a plurality of windows;

a fixed photo-detector detecting the amount of light transmitted through said plurality of windows to provide a first signal at a first level in the absence of torque induced resilient deformation from the fixed light emitting diode and to provide a second signal at a second level upon impact when the rings are arrested by workpiece resistance with the said shaft portion temporarily deformed by torque induced resilient deformation; and means for stabilising the LED output in the course of operation to thereby provide a predetermined relationship between first and second signal and torque induced resilient deformation.

13. Torque transducing system as claimed in claim 12 wherein a frequency responsive network is provided for receiving the photo detector means output and providing an output to a control means for interrupting impacting when a desired torque has been retained by a member to be fastened.

14. A system according to claim 12 in which the radially extending portion has slots extending radially inwards from the periphery and are of lightweight/high strength material.

15. A system according to claim 14 in which the material is titanium.

16. A system according to claim 12 in which pins are provided in the axially extending portions to locate the rings against angular movement on the shaft and sleeves are mounted surrounding the respective axially extending portions to hold the pins captive.

17. A system according to claim 12 in which a further photo detector means is provided arranged to detect a proportion of the output of the LED, which portion is not passed along the ring circumference by refractive means and the output of said further photo detector is supplied to a circuit stabilising the LED.

18. A system according to claim 17 in which a fibre-optic bundle is provided for conveying the LED source output, a first sub-bundle being connected to irradiate the ring circumference and a second sub-bundle constituting the refractive means connecting to the further photo detector means.

19. A system according to claim 12 in which fibre optic means are provided for conveying the LED output, said means including a first fibre-optic bundle between the LED and a position adjacent the rings, a second fibre optic bundle, a further photo-detector at the end of the second bundle, a circuit for driving the LED controlled by the output of the further photo-detector to hold the LED output stable, the end of the first bundle adjacent the rings being spaced from the further photo detector to enable transmitted light to mingle.

20. A system according to claim 12 in which the bushes are aligned to permit light to pass through the apertures on transformation of the torque transformable portion in either direction of angular twist.

21. A system according to claim 12 wherein an optical path is provided for light from the LED to be transmitted directly to the first photo detector means without passing through the radially extending ring portions to avoid dark-current characteristics.

22. A tool having a torque transducing system including;

a housing;

bearing means at the front and rear of the housing;

a shaft mounted in the housing in the bearing means adapted for receiving input torque, at the rear end and providing output torque to a workpiece at the front end;

a resilient torque transformable portion formed by the shaft between the bearing means;

a pair of annular coaxial rings each having a portion extending radially of the shaft, said radially extending portion forming light transmitting windows and an axially extending portion integral with the radial portion mounted resistant to impact torque on a portion of the shaft between the resilient torque transformable portion and the bearing means, the respective rings being so mounted at opposite ends of the torque transformable portion, with their respective radially extending portions being in close proximity, the windows being spaced regularly along the entire periphery of the rings, one to move conjointly with the front end and the other with the rear end, the rings being substantially aligned to allow light transmission in the absence of torque induced resilient deformation and being mutually offset on torque induced resilient deformation of the said shaft portion so as to vary total light transmission;

a fixed light emitting diode irradiating a sector of said rings containing at least a plurality of windows;

a fixed photo-detector detecting the amount of light transmitted through said plurality of windows to provide a first signal at a first level in the absence of torque induced resilient deformation from the fixed light emitting diode and to provide a second signal at a second level upon impact when the rings are arrested by workpiece resistance with the said shaft portion temporarily deformed by torque induced resilient deformation; and means for stabilising the LED output in the course of operation to thereby provide a predetermined relationship between first and second signal and torque induced resilient deformation.

* * * * *